(12) United States Patent
Shimazawa et al.

(10) Patent No.: US 7,031,011 B2
(45) Date of Patent: Apr. 18, 2006

(54) IMAGE FORMING APPARATUS USING IMAGE DATA AND IDENTIFICATION INFORMATION IN RELATION TO AN OUTPUT APPARATUS

(75) Inventors: Yoichi Shimazawa, Nara (JP); Syoichiro Yoshiura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 408 days.

(21) Appl. No.: 10/453,019

(22) Filed: Jun. 3, 2003

(65) Prior Publication Data
US 2003/0193694 A1    Oct. 16, 2003

Related U.S. Application Data

(62) Division of application No. 09/456,670, filed on Dec. 9, 1999, now Pat. No. 6,927,870.

(30) Foreign Application Priority Data
Dec. 9, 1998 (JP) ............................... P10-349741

(51) Int. Cl.
*G06F 3/12* (2006.01)
*G06F 13/00* (2006.01)
(52) U.S. Cl. ..................................... 358/1.15; 358/1.14
(58) Field of Classification Search ............... 358/1.15, 358/1.14, 1.9, 3.28, 501, 401, 403, 452, 453; 382/113, 170, 177
See application file for complete search history.

(56) References Cited

U.S. PATENT DOCUMENTS

| | | | |
|---|---|---|---|
| 5,257,119 A | 10/1993 | Funada et al. | |
| 5,465,161 A | 11/1995 | Funada et al. | |
| 5,499,294 A | 3/1996 | Friedman | |
| 5,652,830 A | 7/1997 | Yamamoto et al. | |
| 5,671,277 A | 9/1997 | Ikenoue et al. | |

(Continued)

FOREIGN PATENT DOCUMENTS

EP    0 496 190    7/1992

(Continued)

OTHER PUBLICATIONS

Japanese Office Action regarding Application No. 10-34971 mailed Jul. 8, 2003.

(Continued)

*Primary Examiner*—Douglas Q. Tran
(74) *Attorney, Agent, or Firm*—Renner, Otto, Boisselle & Sklar, LLP

(57) ABSTRACT

The present invention is directed to the provision of an image forming apparatus capable of effectively preventing the formation of images related to illegal conducts by making provisions so that, even in situations where images can be formed based on image data outputted from any arbitrary image output apparatus, the image output apparatus which outputted the image data can be identified without fail. When image data is inputted from a portable image output apparatus, first it is checked whether identification information has been inputted together with the image data, then an image of an identification pattern is created, and image formation is performed based on image data obtained by attaching the image data of the identification pattern to the input image data. On the other hand, when image data is inputted from a fixed image output apparatus, first it is checked whether identification pattern data is included in a designated position in the image data, and then image formation is performed based on the input image data. The image thus formed by the digital copying machine contains the image of the identification pattern by which the image supply device that outputted the source image data is identified.

7 Claims, 7 Drawing Sheets

U.S. PATENT DOCUMENTS

| | | |
|---|---|---|
| 5,737,100 A | 4/1998 | Funada et al. |
| 5,742,408 A | 4/1998 | Funada et al. |
| 5,870,207 A | 2/1999 | Kamimoto et al. |
| 5,987,228 A | 11/1999 | Nishizawa |
| 6,095,566 A | 8/2000 | Yamamoto et al. |
| 6,342,954 B1 | 1/2002 | Hisatomi et al. |

FOREIGN PATENT DOCUMENTS

| | | |
|---|---|---|
| EP | 5-30247 | 2/1993 |
| EP | 0 711 061 A1 | 11/1995 |
| EP | 1 111 900 A2 | 11/1995 |
| EP | 0 830 008 | 3/1998 |
| EP | 0 844 781 | 5/1998 |
| EP | 0 858 042 | 8/1998 |
| JP | 2 614369 | 10/1992 |
| JP | 7-30743 | 1/1994 |
| JP | 6-268839 | 9/1994 |
| JP | 6-326854 | 11/1994 |
| JP | 8-139906 | 5/1996 |
| JP | 10-271318 | 9/1998 |
| JP | 10-308870 | 11/1998 |
| JP | 61-285578 | 12/1998 |

OTHER PUBLICATIONS

Japanese Office Action regarding Application No. 10-34971 mailed Oct. 21, 2003.

European Search Report regarding Application No. EP 99 30 9905, dated Feb. 18, 2002.

IMAGE FORMING APPARATUS USING IMAGE DATA AND IDENTIFICATION INFORMATION IN RELATION TO AN OUTPUT APPARATUS

This is a division of application Ser. No. 09/456,670, filed Dec. 9, 1999 now U.S. Pat. No. 6,927,870.

BACKGROUND OF THE INVENTION

1. Field of the Invention

The present invention relates to an image forming apparatus for reproducing an image from image data supplied from an image output apparatus, and more particularly to an image forming apparatus for reproducing an image by superimposing thereon an identification pattern for identifying the image output apparatus that supplied the image data.

2. Description of the Related Art

In recent years, digital color image forming apparatuses (copying machines, printers, etc.) capable of faithfully reproducing color images have been introduced commercially, and recording media (recording paper, etc.) with color images reproduced thereon can be easily obtained. Some image forming apparatuses are designed not only as digital color copying machines to make copies of document images, but also as printers to form images based on image data supplied from external apparatuses. Using such a digital color copying machine equipped with a function as a so-called network printer, a recording medium with a color image formed thereon can be easily prepared from image data supplied from any one of a plurality of image output apparatuses connected to the network.

As faithfully reproduced color images can be easily obtained using such image forming apparatuses, there arises the concern that image forming apparatuses might be used for wrongful purposes, for example, for illegal replication of images, such as bank notes and securities, replication of which is prohibited.

To address this situation, Japanese Examined Patent Publication JP-B2 2614369 discloses a configuration wherein when recording an inputted color image on a recording medium for reproduction, a pattern image representing identification information unique to the image forming apparatus is added using a color material that is difficult to discern by the human eye. On the other hand, Japanese Unexamined Patent Publication JP-A 61-285578 (1986) discloses an electronic file system wherein when viewing image information stored in an electronic file apparatus, code information for identifying the user is entered and, when outputting retrieved image information, a pattern image identifying the user is superimposed on the retrieved image for output. Further, Japanese Unexamined Patent Publication JP-A 6-326854 (1994) discloses a configuration wherein an image is outputted appending thereto image information which indicates which image output source outputted the image among a plurality of image output sources, i.e., external apparatuses connected to the image forming apparatus.

However, any of the above prior art configurations can only be applied in an environment where users or apparatuses that are allowed to use the image forming apparatus are predetermined, and cannot be applied in an environment where unspecified individuals or apparatuses are expected to use the image forming apparatus; therefore, the prior art has had the problem that illegal conducts such as the forgery of bank notes, securities, etc. cannot be prevented securely.

In recent years, a variety of portable peripheral apparatuses such as digital cameras and portable terminal apparatuses that handle images as data have been commercialized, and various methods have been standardized as data communication methods for connecting such peripheral apparatuses to image forming apparatuses. It has also been proposed to input color image data, created by portable image output apparatuses such as digital cameras and portable terminal apparatuses, into image forming apparatuses via interfaces such as IrDA without using any cables. If image forming apparatuses equipped with such interfaces are installed in stores such as convenience stores, situations are expected to occur that make it quite easy for unspecified individuals to obtain faithfully reproduced color images using such image forming apparatuses. Any of the prior art apparatuses, however, cannot securely prevent illegal conducts because, with the prior art, the individual that is responsible for the illegal conduct or the image output apparatus that outputted the image constituting the illegal conduct cannot be identified from among unspecified individuals or apparatuses.

This problem is not limited to cases where image data are inputted from portable image output apparatuses without using cables, but can also occur in the case of image forming systems in which image data is inputted from an arbitrary image output apparatus, whether it is a portable type or a fixed type, to an image forming apparatus via a general-purpose cable or via a network open to the outside.

SUMMARY OF THE INVENTION

It is an object of the present invention to provide an image forming apparatus which accepts, when forming an image based on image data inputted from an external image output apparatus, not only the input of the image data but also an input of identification information which identifies the image output apparatus that outputted the image data, and performs the image formation by superimposing an image of the identification information on the image data so that the image output apparatus that outputted the image data can be correctly identified at all times from the thus formed image, regardless of the type of the image output apparatus or the type of the interface used, and so that the formation of images constituting illegal conducts can be prevented effectively even in situations where unspecified individuals are allowed to perform image formation using unspecified apparatuses.

The present invention provides an image forming apparatus for forming an image based on image data inputted from an arbitrary image output apparatus, the image forming apparatus performing a judging process of judging whether identification information which identifies the image output apparatus which outputted the image data has been inputted together with the image data, and an image formation process is performed to form an image based on the image data only when the identification information has been inputted together with the image data.

In the image forming apparatus of this invention, when image data is inputted, an image based on the image data is formed only when identification information which identifies the image output apparatus that outputted the image data has been inputted together with the image data. Accordingly, image data inputted from an arbitrary image output apparatus will not be reproduced as an image in situations where the image output apparatus that outputted the image data cannot be identified; that is, when an image is reproduced, the image output apparatus that outputted the image data related to a reproduced image is always identifiable.

In this way, image data is prevented from being reproduced as an image in situations where the originating image output apparatus cannot be identified, and once an image is reproduced, the image output apparatus that outputted the image data related to a reproduced image can always be identified correctly. With this arrangement, the image forming apparatus of the invention can effectively prevent the formation of images constituting illegal conducts, even in situations where images can be formed based on image data supplied from any arbitrary image output apparatus.

In the invention it is preferable that the judging process is performed to judge whether identification information which is a piece of data different from the image data has been inputted as an attachment to the image data.

In the image forming apparatus of this invention, when an image data is inputted, image formation based on the image data is performed to reproduce the image data as an image only when identification information which identifies the image output apparatus that outputted the image data has been detected as being inputted as a piece of data different from the image data. Accordingly, image data inputted from an arbitrary image output apparatus will not be reproduced as an image in situations where the image output apparatus that outputted the image data cannot be identified based on the identification information inputted together with the image data; that is, when an image is reproduced, the image output apparatus that output the image data related to the reproduced image is always identifiable.

With this arrangement, the image forming apparatus of the invention can effectively prevent the formation of images constituting illegal conducts, even in situations where images can be formed based on image data supplied from any arbitrary image output apparatus.

Further, in the invention it is preferable that the judging process is performed to judge whether the identification information is included as part of the inputted image data.

In the image forming apparatus of this invention, image formation based on the image data is performed to reproduce the image data as an image only when data of an image corresponding the identification information which identifiesy the image output apparatus that outputted the image data is included as part of the inputted image data. Accordingly, the inputted image data will not be reproduced as an image unless the data of the image corresponding to the identification information is included as part of the inputted image data; that is, when an image is reproduced, the image output apparatus that outputted the image data related to the reproduced image is always identifiable.

With this arrangement, the image forming apparatus of the invention can effectively prevent the formation of images constituting illegal conducts, even in situations where images can be formed based on image data supplied from any arbitrary image output apparatus.

In the invention it is preferable that the image formation process is performed to form an image based on the image data on a portion of which image data of an identification pattern representing the identification information is superimposed.

In the image forming apparatus of this invention, the image based on the inputted image data is reproduced by superimposing on a portion thereof an image of the identification pattern representing the identification information. Accordingly, the image output apparatus that outputted the image data related to the reproduced image is identified without fail based on the reproduced image.

With this arrangement, the image forming apparatus of the invention can effectively prevent the formation of images constituting illegal conducts, even in situations where images can be formed based on image data supplied from any arbitrary image output apparatus.

In the invention it is preferable that when the identification information which identifies the image output apparatus is inputted as a piece of data which is different from the image data and an attachment thereto, an image of an identification pattern representing the identification information is created and the created image is superimposed on a portion of the image formed based on the inputted image data.

In the image forming apparatus of this invention, data of an image of the identification pattern representing the identification information which identifies the image output apparatus that outputted the image data is created, and the inputted image data is reproduced as an image by superimposing on a portion thereof the image data of the identification pattern thus created. Accordingly, even when the identification information is inputted as a piece of data which is different from the image data and an attachment thereto, the image output apparatus that outputted the image data related to the reproduced image is identified without fail based on the reproduced image.

With this arrangement, the image forming apparatus of the invention can effectively prevent the formation of images constituting illegal conducts, even in situations where images can be formed based on image data supplied from any arbitrary image output apparatus.

In the invention it is preferable that a further process is performed in which an image of an identification pattern representing identification information which identifies the image forming apparatus itself is created and the created image is superimposed on a portion of the image formed based on the inputted image data.

In the image forming apparatus of this invention, an image of the identification pattern representing the identification information which identifies the image forming apparatus is included as part of the image reproduced by the image forming apparatus. Accordingly, not only the image output apparatus that outputted the image data related to the reproduced image, but also the image forming apparatus that reproduced the image is identified without fail based on the reproduced image.

With this arrangement, the image forming apparatus of the invention can prevent the formation of images constituting illegal conducts more effectively.

In the invention it is preferable that the image formation process is performed to superimpose the image of the identification pattern with reduced visibility on a portion of the image formed based on the inputted image data.

In the invention, the image of the identification pattern representing the identification information which identifies at least either the image output apparatus or the image forming apparatus is superimposed with reduced visibility on a portion of the image formed based on the inputted image data. Therefore, visual characteristics of the inputted image data are not impaired by the image of the identification pattern.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
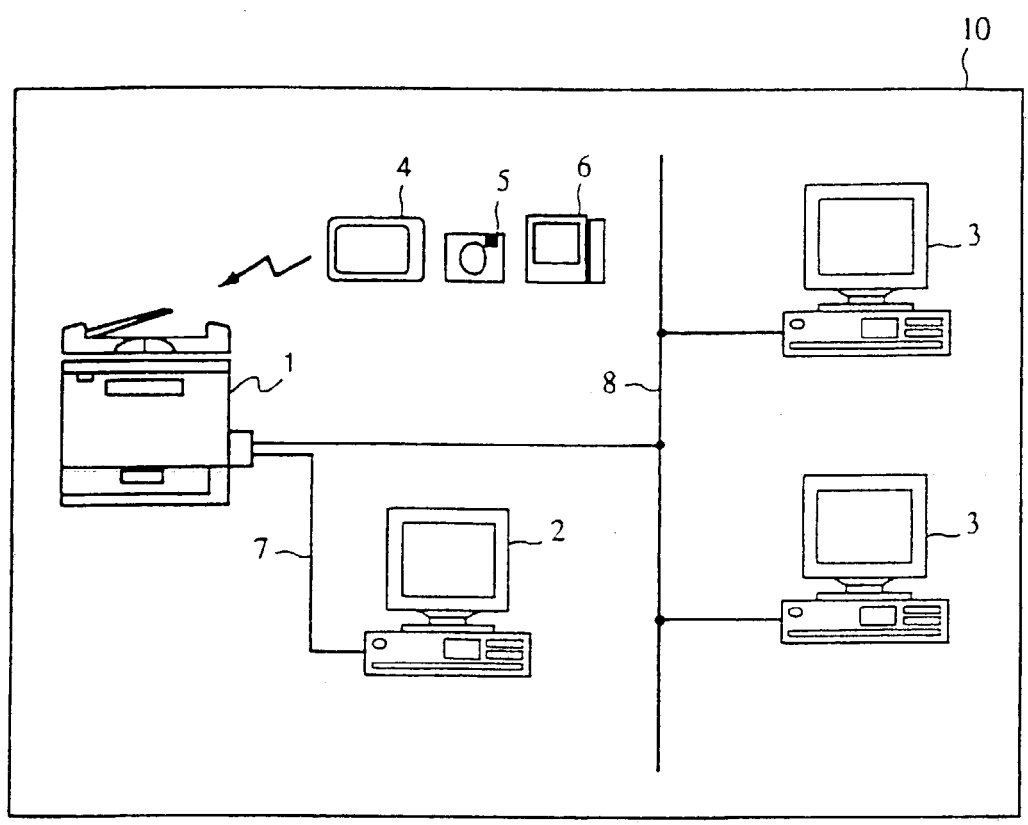
FIG. 1 is a diagram showing the configuration of an image forming system to which is applied a digital color copying machine as an image forming apparatus according to an embodiment of the present invention.

Now referring to the drawings, preferred embodiments of the invention are described below.

FIG. 1 is a diagram showing the configuration of an image forming system to which is applied an image forming apparatus according to an embodiment of the present invention. The image forming system 10 comprises a digital color copying machine 1 as the image forming apparatus, personal computers 2, 3 as fixed image output apparatuses, and a digital camera 4, digital video camera 5, and portable communication terminal 6 as portable image output apparatuses. In the illustrated example, one personal computer is fixedly connected to the digital color copying machine 1 via a cable 7, while the other personal computers 3 are fixedly connected via a network cable 8. On the other hand, the portable image output apparatuses, such as the digital camera 4, digital video camera 5, and portable communication terminal 6, are selectively connected to the digital color copying machine 1 via an interface.

Accordingly, the digital color copying machine 1 functions not only as a copying machine for copying the image of a document placed on a document table, but also as a multifunction printer for reproducing images from image data supplied from the personal computer 2, digital camera 4, digital video camera 5, and portable communication terminal 6, as well as a network computer for reproducing images from image data transmitted from other personal computers 3 in the network.

Figure 2:
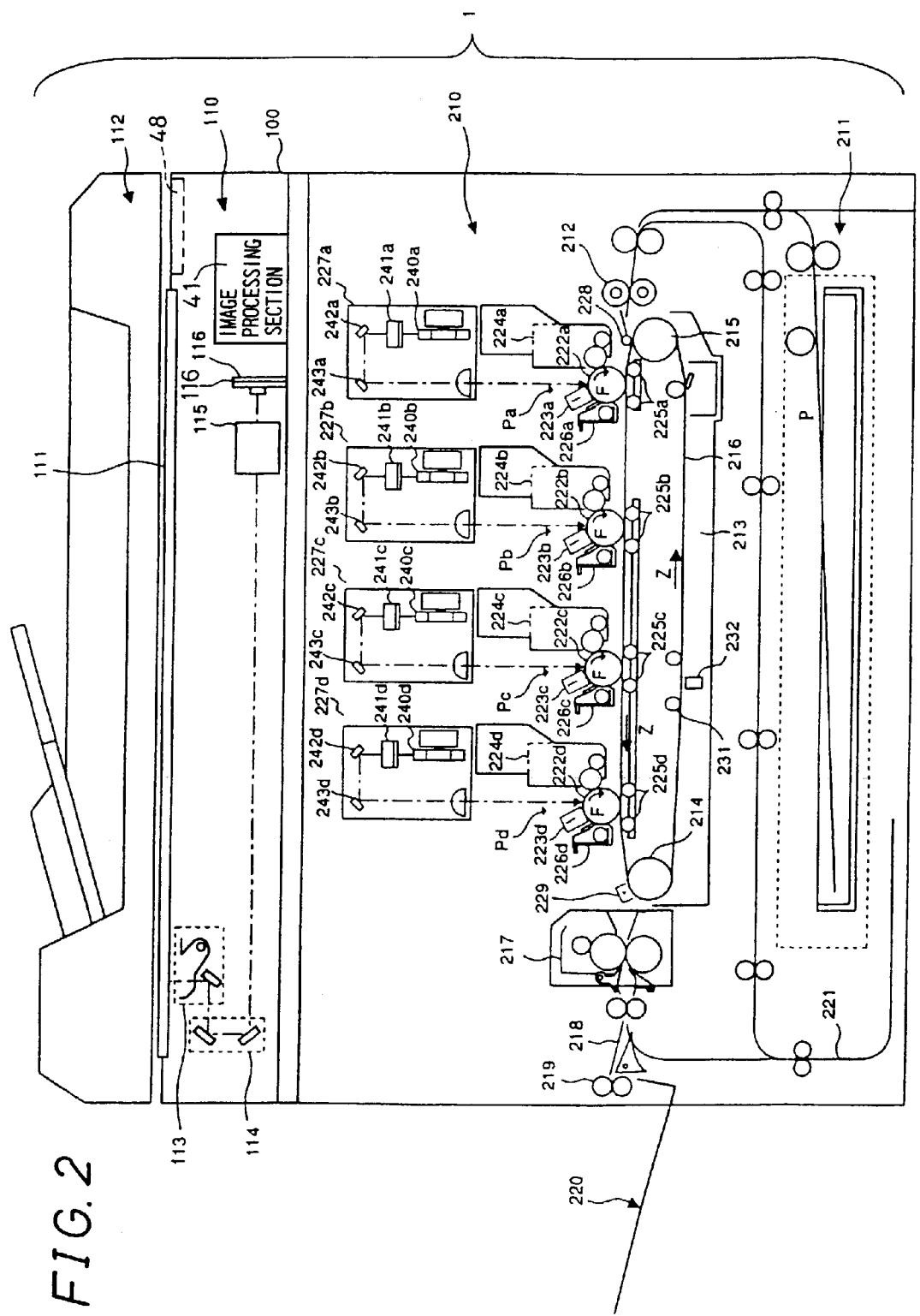
FIG. 2 is a diagrammatic cross sectional front elevation view showing the construction of the digital color copying machine.

FIG. 2 is a diagrammatic cross sectional front elevation view showing the construction of the digital color copying machine 1. A transparent document table 111 and an operation panel 48 are arranged on the upper surface of the main unit 100 of the digital color copying machine 1, while an automatic document feeder 112 capable of being opened and closed is mounted on the upper surface of the document table 111. The copying machine main unit 100 comprises an image reading section 110 and an image forming section 210. A paper feed section 211 is disposed in the lowermost part of the copying machine main unit 100.

The automatic document feeder 112 feeds the documents placed in a document tray one by one to the designated position on the upper surface of the document table 111, with one side of each document facing the upper surface of the document table 111 and, after reading the image on the one side, turns the document over and feeds it back to the designated position on the upper surface of the document table 111, this time with the other side of the document facing the upper surface of the document table 111. When the image reading is completed on both sides of the document, the document is exited, and the next document in the document tray is fed, first with one side and then with the other side facing the upper surface of the document table 111, as described above, repeating this process until all the documents are copied. The document feed process in the automatic document feeder 112, including the reversing process of the document, is controlled in conjunction with the entire operation of the copying machine main unit 100.

The document reading section 110 reads the image on the surface of the document fed by the automatic document feeder 112 onto the document table 111. For this purpose, the document reading section 110 includes a first mirror base 113 and a second mirror base 114 which move in reciprocating fashion along the underside of the document table 111. The first mirror base 113 is mounted with an exposure lamp and a mirror, and is moved in reciprocating fashion at a prescribed speed along the underside of the document table 111. The second mirror base 114 is mounted with two mirrors, and is moved in reciprocating fashion along the underside of the document table 111 at a speed one half that of the first mirror base 113.

Light irradiated from the exposure lamp mounted on the first mirror base 113 is reflected at the image surface of the document, and the reflected light is further reflected by the mirrors mounted on the first mirror base 113 and second mirror base 114, and is focused through a lens 115 onto a light receiving surface of a photoelectric converting element 116. The photoelectric converting element 116 outputs a light receiving signal proportional to the intensity of the reflected light falling on the light receiving surface. The light receiving signal outputted from the photoelectric converting element 116 undergoes prescribed processing in an image processing section 41, to be described later, and the processed signal is used as image data.

The paper feed section 211 feeds a plurality of paper sheets accommodated in a paper feed cassette by separating one sheet at a time. The sheet fed out of the paper feed section 211 is introduced into the image forming section 210 with a timing synchronized to the operation of the image forming section 210. In the lower part of the image forming section 210 is disposed a transport belt 216 which is run over a pair of rollers 214, 215 and rotates in the direction of arrow Z. The sheet introduced into the image forming section 210 is transported through the image forming section 210 by being electrostatically attracted to the surface of the transport belt 216.

In the copying machine main unit 100, a fixing apparatus 217 is disposed on the downstream side of the upper surface of the transport belt 216 moving in the direction of the arrow Z. The fixing apparatus 217 applies heat and pressure to the sheet that carries on its surface a developer image transferred in the image forming section 210, and the developer image is thus melted and fixed to the surface of the sheet. The sheet passed through the fixing apparatus 217 is exited by means of paper ejection rollers 219 onto a paper ejection tray 220 mounted on one side of the copying machine main unit 100. Disposed between the fixing apparatus 217 and the paper ejection rollers 219 is a gate 218 by which the sheet exiting from the fixing apparatus 217 after one-side copying is directed to a switchback transport path 221. The sheet introduced into the switchback transport path 221 after one-side copying is turned over and fed back into the image forming section 210.

Above the transport belt 216 in the image forming section 210 are disposed four image forming stations Pa to Pb arranged in this order as viewed from the upstream end of the upper surface of the transport belt 216 moving in the direction of the arrow Z. Accordingly, the upper surface of the sheet being transported through the image forming section 210 by the transport belt 216 is brought opposite the image forming stations Pa to Pb in this order.

The image forming stations Pa to Pb are substantially the same in construction. As an example, the image forming station Pa includes a photoconductor drum 222a, a charger 223a, a developing apparatus 224a, a transfer apparatus 225a, and a cleaner 226a. The photoconductor drum 222a is driven for rotation at a constant speed in the direction of arrow F. The charger 223a evenly applies an electrical charge of the same polarity to the surface of the photoconductor drum 222a. The developing apparatus 224a develops the electrostatic latent image formed on the surface of the photoconductor drum 222a into a visible developer image. The transfer apparatus 225a transfers the developer image held on the surface of the photoconductor drum 222a onto the surface of the paper. The transfer apparatus 225a is disposed opposite the photoconductor drum 222a with the transport belt 216 interposed therebetween. The cleaner 226a removes residual developer from the surface portion of the photoconductor drum 222a that passed the position opposing the transfer apparatus 225a across the transport belt 216.

Above the image forming stations Pa to Pb are disposed scanner units 227a to 227d, respectively. The scanner units 227a to 227d, respectively, apply image light based on the image data separated into black, cyan, magenta, and yellow colors, to the surfaces of the photoconductor drums 222a to 222d, respectively, electrically charged by the respective chargers 223a to 223d. The scanner units 227a to 227d are fundamentally the same in construction. As an example, the black scanner unit 227a comprises a polygon mirror 240a by which laser light emitted from a semiconductor laser (not shown) and modulated by the black image data is deflected in the main scanning direction, and an fθ lens 241a and mirrors 242a, 243a by which the laser light deflected by the polygon mirror 240a is applied at a predetermined application angle to the surface of the photoconductor drum 222a.

The surface of each of the photoconductor drums 222a to 222d is coated with a photoconductive layer, and the charges in areas of the surfaces of the photoconductor drums 222a to 222d exposed to the laser light from the respective laser units, which charges are provided by the chargers 223a to 223d prior to the laser light application, are selectively dissipated by the photoconductive effect Electrostatic latent images based on the respective color image data are thus formed on the surfaces of the respective photoconductor drums 222a to 222d. Then, each developing apparatus 224a to 224d supplies a developer of the same color as that of the image data used to modulate the laser light emitted from the associated laser unit, onto the surfaces of the respective photoconductor drums 222a to 222d. In this way, developer images of the respective colors are formed on the surfaces of the respective photoconductor drums 222a to 222d.

The timing at which the laser light is emitted from the laser unit in each of the image forming stations Pa to Pd is determined by the moving speed of the upper surface of the transport belt 216 along the direction of the arrow Z and the spacing between the respective photoconductor drums 222a to 222d, and the developer images of the respective colors held on the respective photoconductor drums 222a to 222d are superimposed one on top of another on the same position on the surface of the paper.

A belt charger 228 is disposed on the upstream side of the image forming station Pa in contacting relationship to the upper surface of the transport belt 216 moving in the direction of the arrow Z, while a charge erasure device 229 is disposed on the downstream side of the image forming station Pd in contacting relationship to the upper surface of the transport belt 216 moving in the direction of the arrow Z. The belt charger 228 applies to the surface of the paper as well as the transport belt 216 an electrical charge necessary to electrostatically attract the paper to the surface of the transport belt 216. The charge erasure device 229 applies a corona discharge to separate the paper from the surface of the transport belt 216.

In some designs, a post-handling unit such as a sorter may be mounted on the paper exit side of the machine main unit 100. Further, a plurality of paper feed cassettes may be mounted in stacked fashion in the paper feed section 211; in this case, paper is fed from a selected one of the paper feed cassettes.

Figure 3:
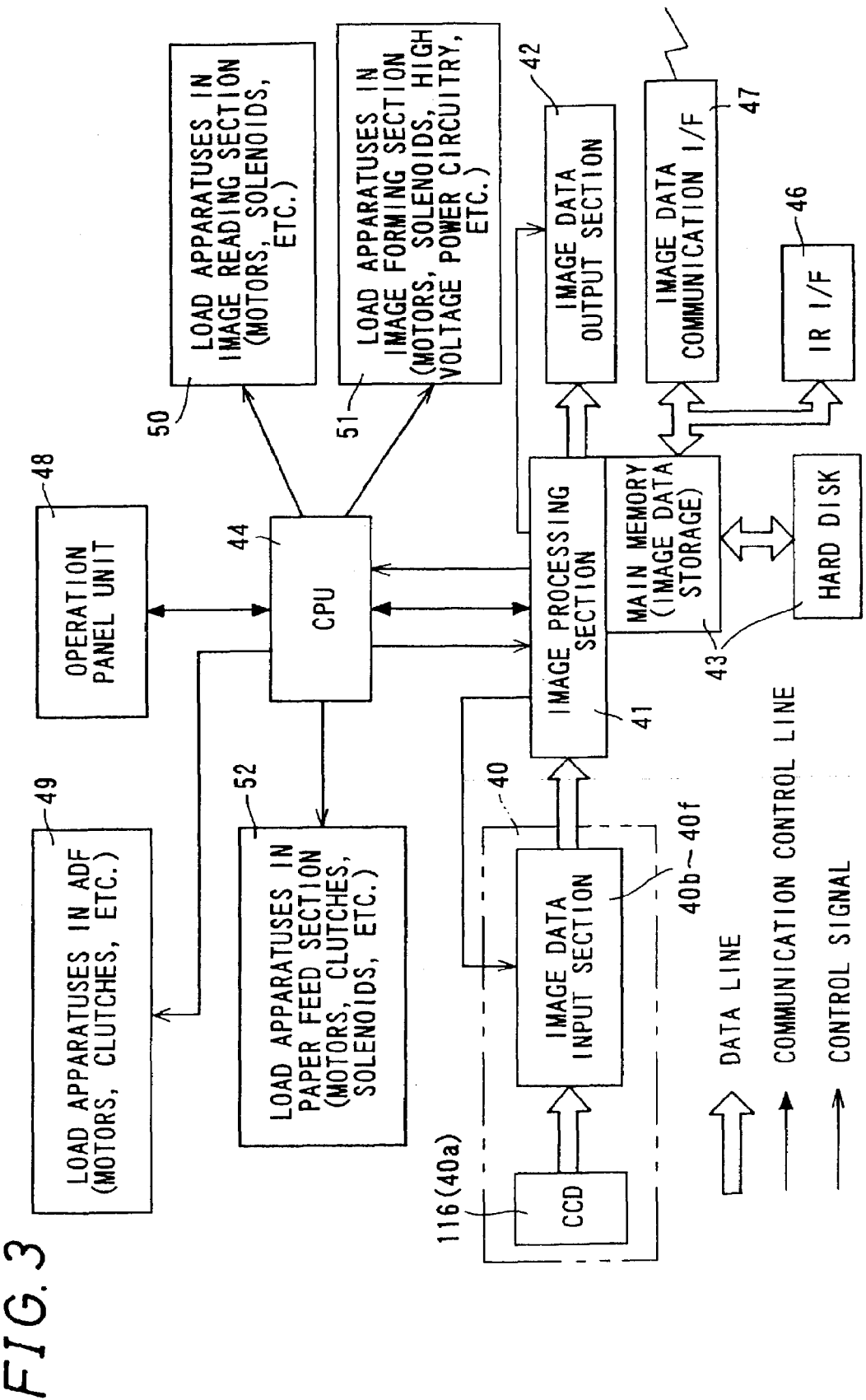
FIG. 3 is a block diagram showing the configuration of a control section of the digital color copying machine.

FIG. 3 is a block diagram showing the configuration of a control section of the digital color copying machine 1. The control section of the digital color copying machine 1 includes a CPU 44 to which are connected the image processing section 41, operation panel unit 48, load apparatuses 49 such as motors and clutches mounted in the automatic document feeder 112, load apparatuses 50 such as motors and solenoids mounted in the image reading section 110, load apparatuses 51 such as motors, solenoids, and high-voltage power circuitry mounted in the image forming section 210, and load apparatuses 52 such as motors, clutches, and solenoids mounted in the paper feed section 211.

Based on operation data entered by operating key switches on the operation panel in the operation panel unit 48, the CPU 44 outputs control data to the image processing section 41 and the respective load apparatuses 49 to 52, while at the same time, outputting display data to the operation panel unit 48 to display operating conditions of the image processing section 41, automatic document feeder 112, image reading section 110, image forming section 210, and paper feed section 211. The operation panel unit 48 displays the contents of the display data received from the CPU 44 on a display mounted in the operation panel.

Figure 4:
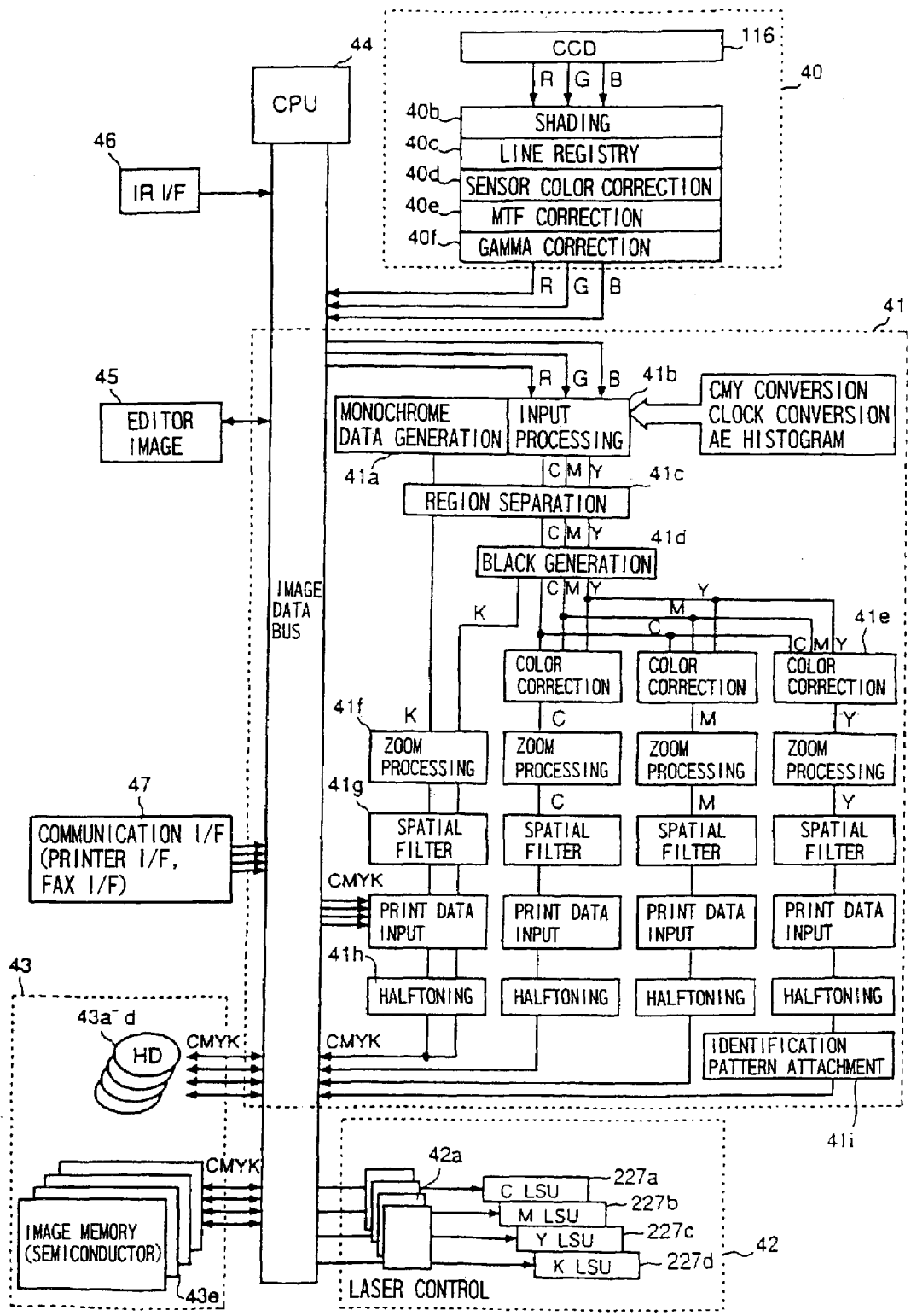
FIG. 4 is a block diagram showing the configuration of an image processing section of the digital color copying machine.

FIG. 4 is a block diagram showing the configuration of the image processing section 41 of the digital color copying machine 1. An image data input section 40, image data output section 42, memory 43, IR interface 46, and communication interface 47 are connected to the image processing section 41 of the digital color copying machine 1.

The image data input section 40 includes the photoelectric converting element 116 mounted in the image reading section 110. The photoelectric converting element 116 outputs line data obtained by reading the image of a monochrome or color document and decomposing it into RGB color components.

The image data input section 40 also includes: a shading correction circuit 40b for correcting the line image level of the line data outputted from the photoelectric converting element 116; a line registering unit 40c constructed from a line buffer or the like for correcting displacements between the line image data of the three colors; a sensor color corrector 40d for correcting color data of the line image data of each color; an MTF corrector 40e for correcting pixelby-pixel signal contrast; and a gamma corrector 40*f* for correcting image appearance by correcting the lightness/darkness of the image.

The image processing section 41 includes: a monochrome data generator 41*a* for generating monochrome data from RGB signals, i.e., the color image signals inputted from the image data input section 40; an input processing unit 41*b* for converting the RGB signals into YMC signals corresponding to the three subtractive primary colors, and for performing clock conversion at the same time; a region separation unit 41*c* for classifying the inputted image data into one of three regions, a character region, a halftone photograph region, or a print photograph region; a black generator 41*d* for generating black image data by performing base color removal based on the YMC signals outputted from the input processing unit 41*b*; a color correction circuit 41*e* for correcting the color image signal of each color based on each color conversion table; a zoom processing circuit 41*f* and spatial filter 41*g* for converting the magnification ratio of the inputted image data based on a preset magnification; and a halftoning unit 41*h* for performing processes such as a multi-value error spreading process and a multi-value dithering process for enhancing gray scale reproduction.

The image processing section 41 also includes an identification pattern appending unit 41*i* for appending prescribed identification information to the image data of yellow (Y) that has undergone the above processing. The identification pattern appending unit 41*i* appends the prescribed identification information in the form of a low-visibility yellow image to the image data without impairing the characteristics of the inputted image data. This identification information at least includes unique identification information which identifies the apparatus that supplied the image data to the digital color copying machine 1, and optionally includes unique identification information which identifies the digital color copying machine 1 itself.

The image data thus processed in the image processing section 41 is temporarily stored in an image memory 43. The image memory 43 sequentially receives 32-bit image data serially outputted from the image processing section 41, and while temporarily storing the data in a buffer, converts the data into 8-bit image data for each of the yellow, magenta, cyan, and black colors and stores the converted data on four hard disks 43*a* to 43*d*, respectively. With respect to outputting of the image data from the image memory 43 to the image data output section 42, since timings with which the recording paper is opposed to the respective image forming stations Pa to Pd in the image forming section 210 vary from image forming station to image forming station, proper timings of outputting the image data for the respective colors vary from color to color. For this reason, the image memory 43 includes buffer memories 43*e*, and the image data of the respective colors are outputted from the corresponding buffer memories 43*e* by sequentially delaying the timing in accordance with the installed positions of the respective image forming stations Pa to Pd.

The image data output section 42 includes a laser control units 42*a* for performing pulse width modulation on the basis of the image data of the respective colors outputted from the halftoning units 41*h* and identification pattern appending unit 41*i* in the image processing section 41, and the scanner units 227*a* to 227*d* for applying laser light to the surfaces of the photoconductor drums 222*a* to 222*d* on the basis of the pulse width modulated signals outputted from the respective laser control units 42*a*.

Image data is inputted from an external image input apparatus such as the digital camera 4, digital video camera 5, or other portable terminal apparatuses to the IR interface 46 without using any cables. On the other hand, image data from the personal computers 2, 3 or facsimile machines is inputted to the communication interface 47 via the cable 7 or network cable 8 as shown in FIG. 1. The communication interface 47 thus functions as a printer interface as well as a facsimile interface.

The image data inputted via the interfaces 46, 47 also undergoes the prescribed processing in the image processing section 41. However, when the image data inputted from the interface 46 or 47 is a YMC signal, the processing in the input processing unit 41*b* is not performed.

The image data input section 40, image data output section 42, memory 43, IR interface 46, and communication interface 47 described above are controlled together via the image processing section 41 by the CPU 44 forming the control section of the digital color copying machine 1.

An image editor 45 may be connected to the image processing section 41. The image editor 45 performs editing on the image data stored in the image memory 43 in accordance with edit commands entered from the operation panel.

Figure 5:
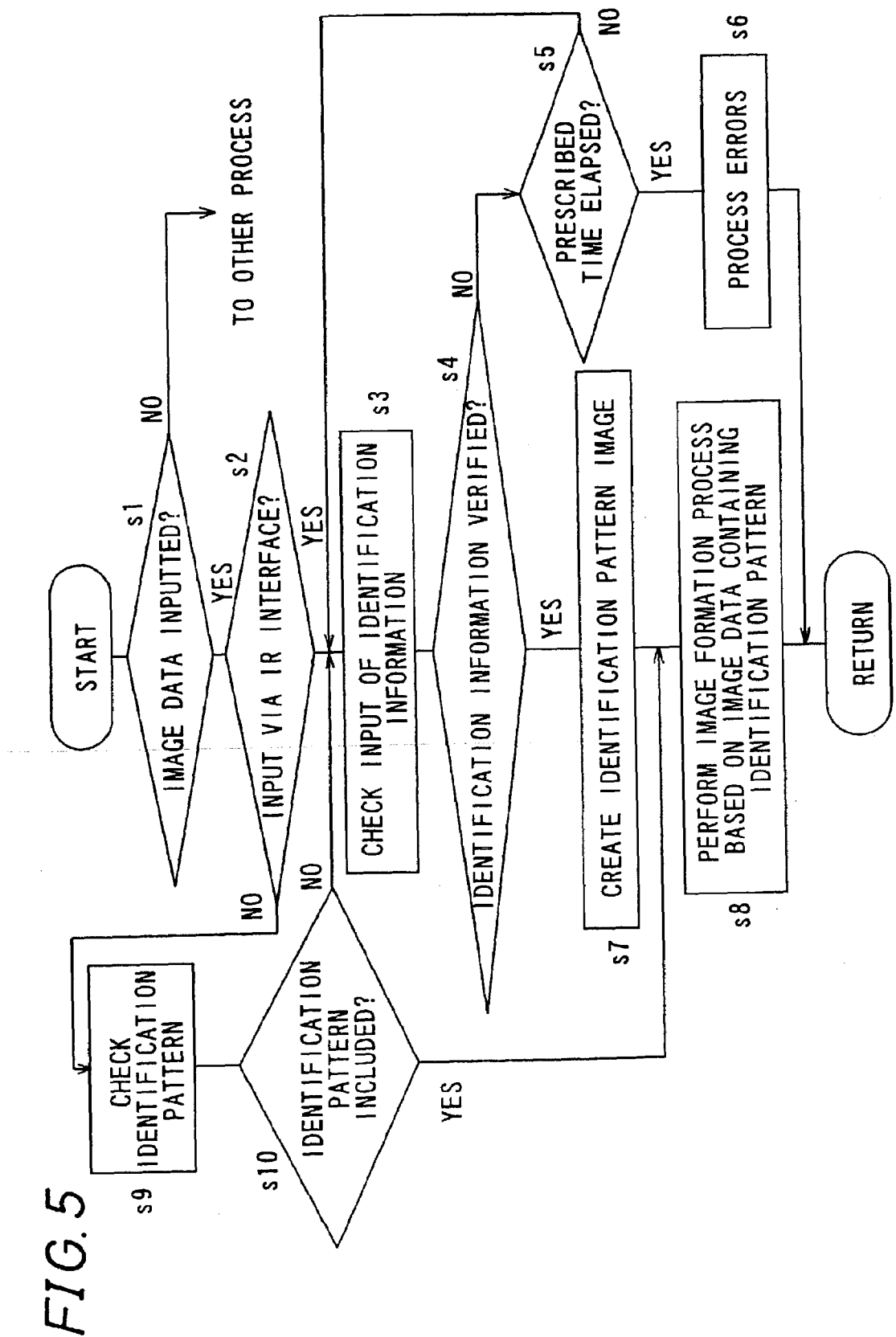
FIG. 5 is a flow chart illustrating the sequence of processing performed by a CPU in the control section of the digital color copying machine when image data is inputted from an image output apparatus.

FIG. 5 is a flow chart showing part of the processing procedures performed by the CPU, illustrating the sequence of processing when image data is inputted to the digital color copying machine 1 from an external image output apparatus. When image data is inputted from an external image output apparatus via the interface 46 or 47 (s1), the CPU 44 in the digital color copying machine 1 discriminates the type of the interface, the IR interface 46 or the communication interface 47, via which the image data has been inputted (s2). When the image data has been inputted via the IR interface 46 from a portable image output apparatus such as the portable terminal apparatus 4, the CPU 44 verifies whether identification information which identifies the image output apparatus that outputted the image data has been inputted together with the image data (s3); if a predetermined length of time has elapsed without being able to check the input of the identification information, the CPU 44 then performs error processing (s4→s5→s6). In this error processing, image formation based on the inputted image data is prohibited, for example, and a message to that effect is displayed.

If the input of the identification information has successfully been verified before the predetermined length of time elapses, the CPU 44 creates an image of an identification pattern based on the identification information (s4→s7), and performs image formation based on the image data obtained by appending the image data of the identification pattern to the inputted image data (s8). More specifically, the CPU 44 supplies the image data of the identification pattern to the identification pattern appending unit 41*i* which then adds the identification pattern to the image data of yellow (Y).

On the other hand, when the image data has been inputted via the communication interface 47 from a fixed image output apparatus such as a personal computer or a facsimile machine, the CPU 44 verifies whether the identification pattern data identifying the image output apparatus that outputted the image data is included in the designated position in the image data (s9). If no identification pattern data is included in the designated position in the image data, the CPU 44 proceeds to step s3 to judge whether identification information has been inputted together with the image data (s10→s3). On the other hand, if the identification pattern data is included in the designated position in the image data, the CPU 44 executes the image formation processing based on the inputted image data (s10→s8). The image of the identification pattern identifying the image output apparatus that outputted the image data is thus incorporated into the image formed by the digital color copying machine 1.

Here, the step s8 may be preceded by a step for creating an image of an identification pattern based on identification information which identifies the digital color copying machine 1, in addition to the image of the identification pattern identifying the image output apparatus that outputted the image data. By so doing, the image of the identification pattern identifying the apparatus that performed the image formation is incorporated into the image formed by the digital color copying machine 1, together with the image of the identification pattern identifying the image output apparatus that outputted the image data.

In the image forming system according to the present embodiment, each image output apparatus that supplies image data to the digital color copying machine 1 is equipped with a function to output the identification information which identifies the image output apparatus itself, as a separate piece of data attached to the image data, to the digital color copying machine 1, or to incorporate such information as part of the image data.

For example, generally, portable image output apparatuses, such as the digital camera 4, digital video camera 5, and portable terminal apparatus 6, are not equipped with an image formation capability to incorporate the data of the identification pattern image into the image data; in this case, when outputting the image data to the digital color copying machine 1, the identification information which identifies the originating portable image output apparatus is attached as a separate piece of data to the image data to be outputted to the digital color copying machine 1. On the other hand, fixed image output apparatuses such as the personal computers 2, 3 are equipped with the necessary image formation capability, and output the image data to the digital color copying machine 1 by incorporating, as part-of the image data to be outputted, the data of the identification pattern image identifying the originating fixed image output apparatus.

Accordingly, when image data is inputted via the IR interface 46, which is the case when image data is inputted from a portable image output apparatus, since the identification information as a separate piece of data is attached to the inputted image data, the CPU 44 stores the image data and the identification information, inputted via the IR interface 46, into separate memory areas within the image memory 43. On the other hand, when image data is inputted via the communication interface 47, which is used to input image data from a fixed image output apparatus, since the image data is inputted with the image of the identification pattern already incorporated therein, the CPU 44 stores the image data received via the communication interface 47, with the image of the identification pattern incorporated therein, into the image memory 43.

In the process shown in FIG. 5, however, considering the case when a fixed image output apparatus outputs image data that does not incorporate therein an image of the identification pattern by which the fixed image output apparatus is identified, provisions are made to judge whether image data of the identification pattern is included in the designated position in the image data inputted via the communication interface 47 and, if the image data of the identification pattern is not included, to judge whether identification information has been inputted separately from the image data. Accordingly, in the image processing system according to the present embodiment, even when the fixed image output apparatus is an apparatus of a type in which the identification information which identifies the apparatus is outputted separately from the image data, the image of the identification pattern identifying the fixed image output apparatus can be incorporated into the image formed by the digital color copying machine 1.

Figure 6A:
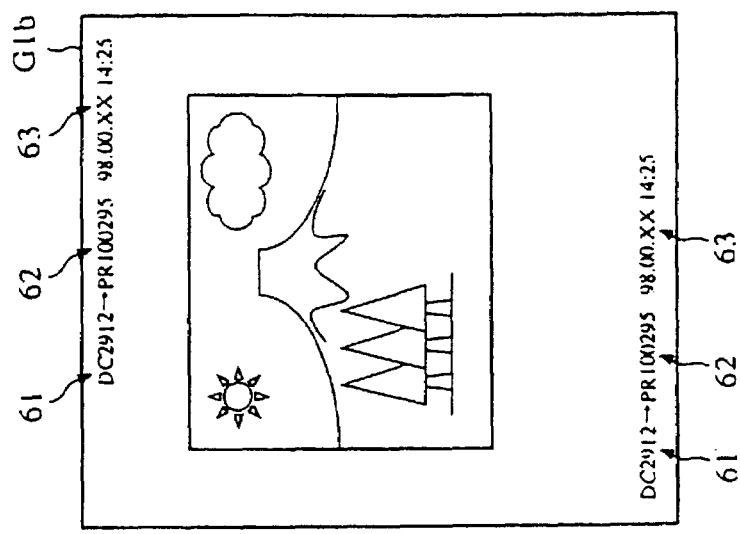
FIGS. 6A to 6C are diagrams showing how an image is formed in the digital color copying machine based on image data outputted from a portable image output apparatus.
Figure 6B:
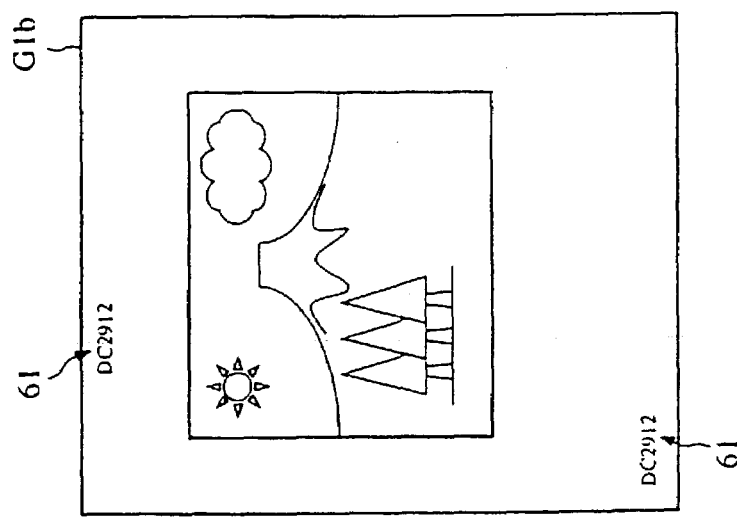
Figure 6C:
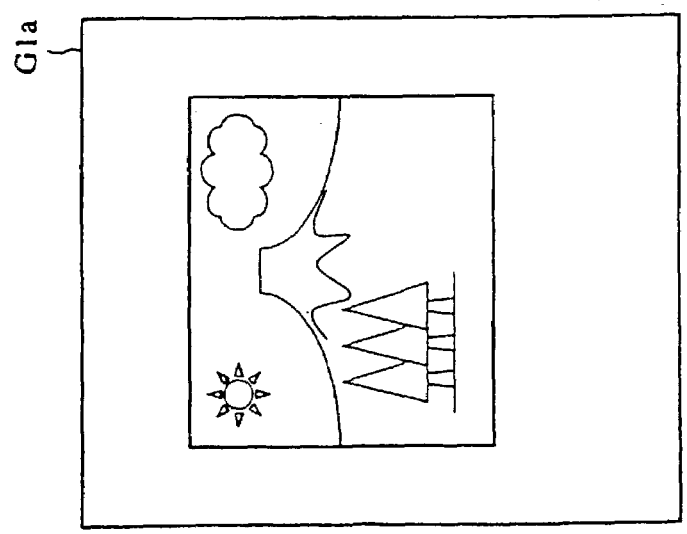

FIGS. 6A to 6C are diagrams showing how the digital color copying machine 1 forms an image based on image data supplied from a portable image output apparatus. When data of the image G1*a* shown in FIG. 6A is inputted from a portable image output apparatus via the IR interface 46, the digital color copying machine 1 creates image data of the identification pattern based on the identification information that was inputted as a separate piece of data attached to the data of the inputted image G1*a*, and forms an image G1*b* by superimposing the identification pattern 61 near the upper and lower edges of the image G1*a*, as shown in FIG. 6B. In this way, the apparatus that outputted the image can be easily identified from the image G1*b* formed by the digital color copying machine 1. Since this identification pattern 61 is formed with low-visibility yellow developer and located near the upper and lower edges where the possibility of overlapping into the image region is small, the formation of the identification pattern does not impair the characteristics of the original image G1*a*.

Further, as shown in FIG. 6C, in addition to the identification pattern 61 for the portable image output apparatus that outputted the data of the image G1*a*, an identification pattern 62 for identifying the digital color copying machine 1 may be formed near the upper and lower edges of the image G1*a* at positions not overlapping with the identification pattern 61. In this way, not only the apparatus that outputted the image but the apparatus that formed the image can also be identified from the image G1*b* formed by the digital color copying machine 1. In this case, a pattern image indicating the input/output status of the image data, as implemented by an arrow or the like, can be included between the identification pattern 61 and the identification pattern 62, and an image 63 indicating the time and date of image formation can also be added.

Figure 7A:
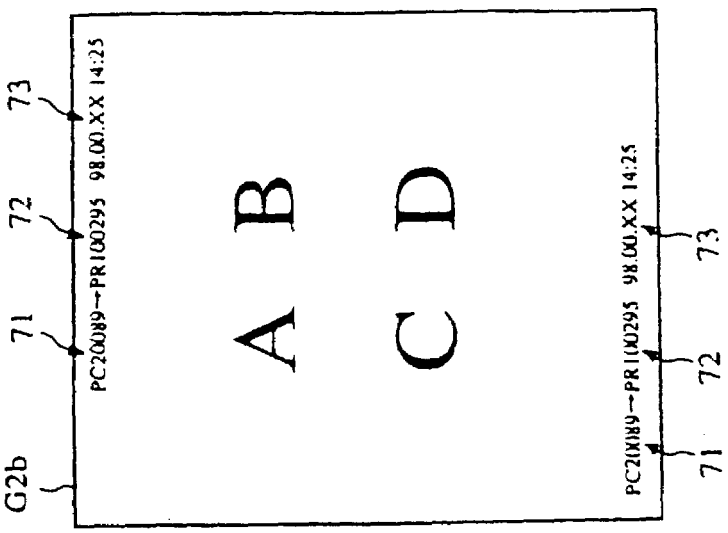
FIGS. 7A to 7C are diagrams showing how an image is formed in the digital color copying machine based on image data outputted from a fixed image output apparatus
Figure 7B:
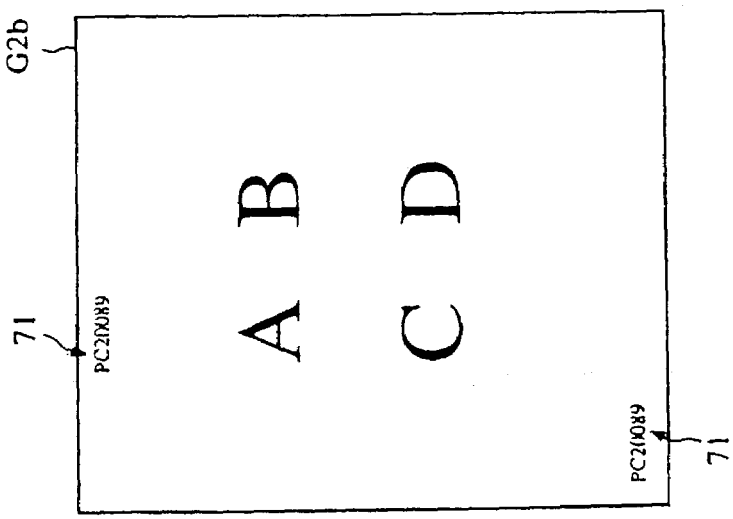
Figure 7C:
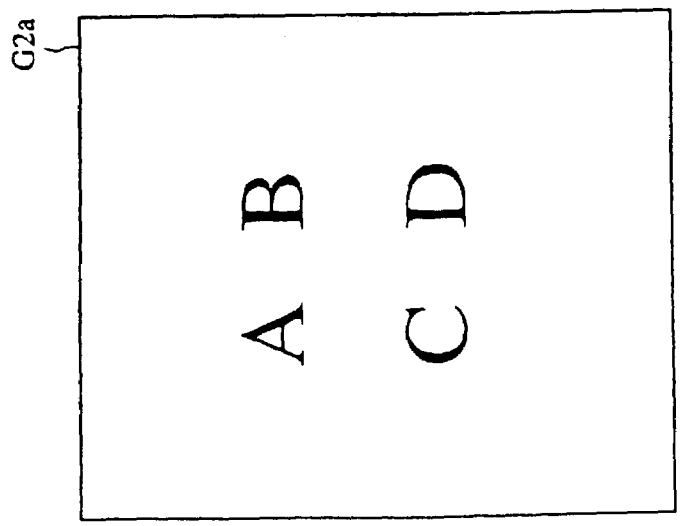

FIGS. 7A to 7C are diagrams showing how the digital color copying machine 1 forms an image based on image data supplied from a fixed image output apparatus. Data of the image G2*a* created in the fixed image output apparatus, as shown in FIG. 7A, is output to the digital color copying machine 1 as data of an image G2*b* in which an identification pattern image 71 for identifying the fixed image output apparatus is superimposed near the upper and lower edges of the image, as shown in FIG. 7B. The digital color copying machine 1 performs image formation based on the data of the image G2*b*, and the image of the identification pattern 71 identifying the fixed image output apparatus that outputted the image data is thus incorporated into the image formed by the digital color copying machine 1. In this way, the apparatus that outputted the image can be easily identified from the image formed by the digital color copying machine 1. Since this identification pattern 71 is formed with low-visibility yellow developer and located near the upper and lower edges where the possibility of overlapping into the image region is small, the formation of the identification pattern does not impair the characteristics of the data of the original image G2*a*.

Further, as shown in FIG. 7C, in addition to the identification pattern 71 for the fixed image output apparatus that outputted the data of the image G2*b*, an identification pattern 72 for identifying the digital color copying machine 1 may be formed near the upper and lower edges of the image G2*b* whose data was inputted from the fixed image output apparatus.

In this way, not only the apparatus that outputted the image but the apparatus that formed the image can also be identified from the image formed by the digital color copying machine 1.

In this case, a pattern image indicating the input/output status of the image data, as implemented by an arrow or the like, can be included between the identification pattern 71 and the identification pattern 72, and an image 73 indicating the time and date of image formation can also be added.

The above embodiment has been described by taking the digital color copying machine as an example, but it will be appreciated that the present invention is equally applicable to other image forming apparatuses that can faithfully reproduce color images based on image data inputted from unspecified image output apparatuses.

The above embodiment has also been described by taking as an example the case where image data is inputted to the digital color copying machine 1 from a portable image output apparatus without using cables, but it will be understood that the invention is equally applicable to an image forming system in which image data is inputted to an image forming apparatus such as a digital color copying machine from an arbitrary image output apparatus, and also that the invention is equally applicable to the case where image data is inputted to the digital color copying machine 1 from a portable image output apparatus by using a cable.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus for forming an image based on image data inputted from an arbitrary image output apparatus, the image forming apparatus performing:

a judging process of judging whether identification information which identifies the image output apparatus which outputted the image data has been inputted together with the image data, and an image formation process is performed to form an image based on the image data only when the identification information has been inputted together with the image data, yet independently of whether the identification information identifies a predefined image output apparatus or a previously undefined image output apparatus.

2. The image forming apparatus of claim 1, wherein the judging process is performed to judge whether identification information which is a piece of data different from the image data has been inputted as an attachment to the image data.

3. The image forming apparatus of claim 1, wherein the judging process is performed to judge whether the identification information is included as part of the inputted image data.

4. The image forming apparatus of claim 1, wherein the image formation process is performed to form an image based on the image data on a portion of which image data of an identification pattern representing the identification information is superimposed.

5. The image forming apparatus of claim 4, wherein when the identification information which identifies the image output apparatus is inputted as a piece of data which is different from the image data and an attachment thereto, an image of an identification pattern representing the identification information is created and the created image is superimposed on a portion of the image formed based on the inputted image data.

6. The image forming apparatus of claim 4, wherein a further process is performed in which an image of an identification pattern representing identification information which identifies the image forming apparatus itself is created and the created image is superimposed on a portion of the image formed based on the inputted image data.

7. The image forming apparatus of claim 4, wherein the image formation process is performed to superimpose the image of the identification pattern with reduced visibility on a portion of the image formed based on the inputted image data.

* * * * *

UNITED STATES PATENT AND TRADEMARK OFFICE
CERTIFICATE OF CORRECTION

| | |
|---|---|
| PATENT NO. | : 7,031,011 |
| APPLICATION NO. | : 10/453019 |
| DATED | : April 18, 2006 |
| INVENTOR(S) | : Yoichi Shimazawa and Syoichiro Yoshiura |

It is certified that error appears in the above-identified patent and that said Letters Patent is hereby corrected as shown below:

On Title Page, Item (54) and Col.1
Title, "IMAGE FORMING APPARATUS USING IMAGE DATA AND IDENTIFICATION INFORMATION IN RELATION TO AN OUTPUT APPARATUS" should read -- IMAGE FORMING APPARATUS --.

Signed and Sealed this

Twenty-ninth Day of August, 2006

JON W. DUDAS
*Director of the United States Patent and Trademark Office*